US012752607B2

(12) United States Patent
Li et al.

(10) Patent No.: US 12,752,607 B2
(45) Date of Patent: Oct. 6, 2026

(54) GLASS ASSEMBLY, VEHICLE WINDOW GLASS AND VEHICLE

(71) Applicant: SAINT-GOBAIN GLASS FRANCE, Courbevoie (FR)

(72) Inventors: Daming Li, Shanghai (CN); Ce Shi, Shanghai (CN); Fangyu Xie, Shanghai (CN); Xiaotong Gao, Shanghai (CN)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 0 days.

(21) Appl. No.: 18/693,065

(22) PCT Filed: Sep. 28, 2022

(86) PCT No.: PCT/CN2022/121987
§ 371 (c)(1),
(2) Date: Mar. 18, 2024

(87) PCT Pub. No.: WO2023/051570
PCT Pub. Date: Apr. 6, 2023

(65) Prior Publication Data

US 2024/0383318 A1 Nov. 21, 2024

(30) Foreign Application Priority Data

Sep. 30, 2021 (CN) .......................... 202111160431.0

(51) Int. Cl.
*B60J 1/20* (2006.01)
*B32B 17/10* (2006.01)
(Continued)

(52) U.S. Cl.
CPC ........... *B60J 1/20* (2013.01); *B32B 17/10036* (2013.01); *B32B 17/10165* (2013.01);
(Continued)

(58) Field of Classification Search
CPC ........... B60J 1/20; F21V 7/28; F21V 2200/20; F21V 33/00; F21V 2200/00; G02B 1/115;
(Continued)

(56) References Cited

U.S. PATENT DOCUMENTS 10,252,494 B2 * 4/2019 Berard .................. F21V 33/006
2008/0232135 A1 * 9/2008 Kinder ................. G02B 6/0053
385/146
(Continued)

FOREIGN PATENT DOCUMENTS

CN 201901648 U 7/2011
CN 103260872 A 8/2013
(Continued)

OTHER PUBLICATIONS

Machine translation of Lee, KR-20120138371-A, published Dec. 26, 2012 (Year: 2012).*
(Continued)

*Primary Examiner* — William N Harris
(74) *Attorney, Agent, or Firm* — CUSHMAN PARTNERS, LLC

(57) ABSTRACT

A glass assembly includes a glass body having a first surface and a second surface which are oppositely arranged, wherein at least a portion of incident light entering the glass body is totally reflected between the first surface and the second surface; a light guiding layer arranged on the first surface or the second surface for guiding the incident light out of the second surface; an anti-reflection layer attached to the second surface to reduce the reflection of the light incident on the second surface from outside of the glass body. According to the glass assembly integrated with the anti-reflection layer, the light pollution reflected by the surface of the glass assembly can be particularly reduced on the
(Continued)

premise of not affecting the performance and aesthetics of the glass, and the user experience can be improved.

19 Claims, 4 Drawing Sheets

(51) Int. Cl.

| | |
|---|---|
| ***F21V 7/28*** | (2018.01) |
| ***F21V 8/00*** | (2006.01) |
| ***G02B 1/11*** | (2015.01) |
| ***G02B 1/115*** | (2015.01) |

(52) U.S. Cl.
CPC .. *B32B 17/10174* (2013.01); *B32B 17/10504* (2013.01); *B32B 17/10513* (2013.01); *B32B 17/10541* (2013.01); *B32B 17/10761* (2013.01); *B32B 17/10788* (2013.01); *F21V 7/28* (2018.02); *G02B 1/11* (2013.01); *G02B 1/115* (2013.01); *G02B 6/0066* (2013.01); *G02B 6/0095* (2013.01); *F21V 2200/20* (2015.01); *G02B 6/0043* (2013.01); *G02B 6/0051* (2013.01); *G02B 6/0091* (2013.01)

(58) Field of Classification Search
CPC ...... G02B 6/0066; G02B 1/11; G02B 6/0095; B32B 17/10165; B32B 17/10174; B32B 17/10504; B32B 17/10513; B32B 17/10541; B32B 17/10761; B32B 17/10788; B32B 17/10036
See application file for complete search history.

(56) References Cited

U.S. PATENT DOCUMENTS

| | | | | |
|---|---|---|---|---|
| 2009/0231972 | A1* | 9/2009 | Usami | G11B 7/24038 369/283 |
| 2018/0052254 | A1* | 2/2018 | Takai | G02B 5/0268 |
| 2018/0273422 | A1* | 9/2018 | Hori | C03C 19/00 |
| 2020/0079687 | A1* | 3/2020 | Bosgaerd | C03C 17/366 |
| 2021/0008846 | A1* | 1/2021 | Kumar | B60K 35/425 |
| 2021/0380841 | A1* | 12/2021 | Laval | C09D 183/06 |
| 2022/0017413 | A1* | 1/2022 | Mitra | C03C 27/10 |
| 2022/0161740 | A1* | 5/2022 | Hick | B29C 45/14434 |

FOREIGN PATENT DOCUMENTS

| | | | | | |
|---|---|---|---|---|---|
| CN | 104884248 | A | | 9/2015 | |
| CN | 107471978 | A | | 12/2017 | |
| CN | 111746234 | A | | 10/2020 | |
| JP | 2016-210665 | A | | 12/2016 | |
| KR | 20090093809 | A | * | 9/2009 | G02B 6/006 |
| KR | 20120138371 | A | * | 12/2021 | G02B 1/14 |
| WO | WO 2019/244608 | A1 | | 12/2019 | |
| WO | WO-2020196594 | A1 | * | 10/2020 | G02B 6/0051 |

OTHER PUBLICATIONS

Machine translation of Sawada, KR-20090093809-A, published Sep. 2, 2009 (Year: 2009).*
Machine translation of Fujii et al., WO 2020/196594, published Oct. 1, 2020 (Year: 2020).*
International Search Report as issued in International Patent Application No. PCT/CN2022/121987, dated Dec. 15, 2022.

* cited by examiner

GLASS ASSEMBLY, VEHICLE WINDOW GLASS AND VEHICLE

CROSS-REFERENCE TO RELATED APPLICATIONS

This application is the U.S. National Stage of PCT/CN2022/121987, filed Sep. 28, 2022, which in turn claims priority to Chinese patent application number 202111160431.0 filed Sep. 30, 2021. The content of these applications are incorporated herein by reference in their entireties.

FIELD OF THE INVENTION

The present disclosure relates to the technical field of glass, in particular to a glass assembly with integrated illumination effect and light pollution reduction function, a vehicle window glass using the glass assembly and a vehicle with the vehicle window glass.

BACKGROUND OF THE INVENTION

With the rapid development of automobile industry and the increasing demand of consumers for vehicle functions, glass with illumination effect has been widely valued by vehicle manufacturers and favored by the consumers. Generally, the glass with illumination effect adopts the method of applying illumination enamel or ink on one side of glass plate based on pattern design, and transmitting incident light emitted by light source arranged on the side of the glass plate or integrated in the glass plate through the pattern area by scattering or diffusing, so as to realize illumination with different effects.

However, for the illuminable vehicle window glass, when the light source used to stimulate the illumination effect of the glass is turned off, in a dark environment (for example, at night), due to the considerable reflectivity of the glass, the light emitted by other light sources inside the vehicle (for example, the instrument panel or the central control screen) will project a significant image on the glass, resulting in light pollution causing discomfort to the eyes of passengers in the vehicle and even causing safety accidents.

SUMMARY OF THE INVENTION

The object of the present disclosure is to provide a glass assembly with integrated illumination effect and light pollution reduction function. By combining anti-reflection design on the surface of the glass, the reflectivity of the surface of the glass can be reduced, the product performance can be improved and the user experience can be enhanced without affecting the illumination effect.

To this end, according to one aspect of the present disclosure, a glass assembly is provided. The glass assembly comprising a glass body having a first surface and a second surface which are oppositely arranged, wherein at least a portion of incident light entering the glass body is totally reflected between the first surface and the second surface; a light guiding layer arranged on the first surface or the second surface for guiding the incident light out of the second surface; an anti-reflection layer attached to the second surface to reduce the reflection of the light incident on the second surface from outside of the glass body.

By providing the anti-reflection layer, the glass assembly of the present disclosure integrates the illumination function and the light pollution reduction function into a whole, thus enhancing the user's comfort. In addition, the application of the anti-reflection layer is easy to implement, so that the glass assembly of the present disclosure has the beneficial effects of simple process, obvious performance improvement and the like.

According to the above technical concept, the embodiments of the present disclosure may further include any one or more of the following alternative forms.

In some alternative forms, the second surface comprises at least a total reflection area and a light guiding area, and the anti-reflection layer covers at least the total reflection area on the second surface.

In some alternative forms, the light guiding layer is a scattering layer arranged on the second surface and forms the light guiding area on the second surface, and the anti-reflection layer is attached to the second surface and covers the light guiding area and the total reflection area.

In some alternative forms, the light guiding layer is a scattering layer arranged on the second surface and forms the light guiding area on the second surface, and the anti-reflection layer is attached to the second surface and only covers the total reflection area on the second surface.

In some alternative forms, the light guiding layer is a scattering layer arranged on the second surface and forms the light guiding area on the second surface, and the anti-reflection layer is attached to and covers the second surface, wherein the light guiding layer is laminated on the anti-reflection layer.

In some alternative forms, the light guiding layer is a scattering layer arranged on the second surface, and the anti-reflection layer is attached to and covers the second surface, wherein the anti-reflection layer comprises a first anti-reflection film and a second anti-reflection film which are laminated, and the light guiding layer is sandwiched between the first anti-reflection film and the second anti-reflection film.

In some alternative forms, the first anti-reflection film is close to the second surface, and the refractive index of the first anti-reflection film is greater than the refractive index of the glass body and the refractive index of the second anti-reflection film.

In some alternative forms, the first anti-reflection film and/or the second anti-reflection film is a single-layer film or formed by laminating multiple layers of films.

In some alternative forms, the light guiding layer is a diffusion layer arranged on the first surface, and the anti-reflection layer is attached to and covers the second surface.

In some alternative forms, the anti-reflection layer is a single-layer film or formed by laminating multiple layers of films.

In some alternative forms, the light guiding layer is an enamel printing layer or an ink printing layer provided on the first surface or the second surface and having a pattern.

In some alternative forms, the light guiding layer is discontinuously arranged on the first surface or the second surface.

In some alternative forms, the glass assembly comprises a first light source which emits the incident light at least partially totally reflected between the first surface and the second surface to realize illumination, and the light incident on the second surface from the outside of the glass body is emitted by a second light source.

In some alternative forms, the anti-reflection layer is attached to the second surface by wet coating, physical vapor deposition or chemical vapor deposition.

In some alternative forms, the glass body is monolithic glass or laminated glass.

In some alternative forms, the glass body is ultra-transparent float glass or non-ultra-transparent float glass.

In some alternative forms, the glass body is an ultra-transparent float glass with a transparent conductive oxide coating, and the anti-reflection layer is attached to the transparent conductive oxide coating.

According to another aspect of the present disclosure, a vehicle window glass made of the above glass assembly is provided. The first surface of the glass body faces the outside of the vehicle and the second surface of the glass body faces the inside of the vehicle.

In some alternative forms, the vehicle window glass is front windshield, rear windshield, skylight glass, door glass or corner window glass.

According to another aspect of the present disclosure, there is provided a vehicle comprising the above-mentioned vehicle window glass.

According to the glass assembly integrated with the anti-reflection layer of the present disclosure, the light pollution reflected by the surface of the glass assembly can be particularly reduced on the premise of not affecting the performance and aesthetics of the glass, and the user experience can be improved. By the combination of various laminated structures, the glass assembly of the present disclosure can be applied to various occasions to meet the diversified requirements of users.

BRIEF DESCRIPTION OF THE DRAWINGS

Other features and advantages of the present disclosure will be better understood by the following alternative embodiments described in detail in conjunction with the accompanying drawings, in the drawings.

DETAILED DESCRIPTION OF EMBODIMENTS

Figure 1A:
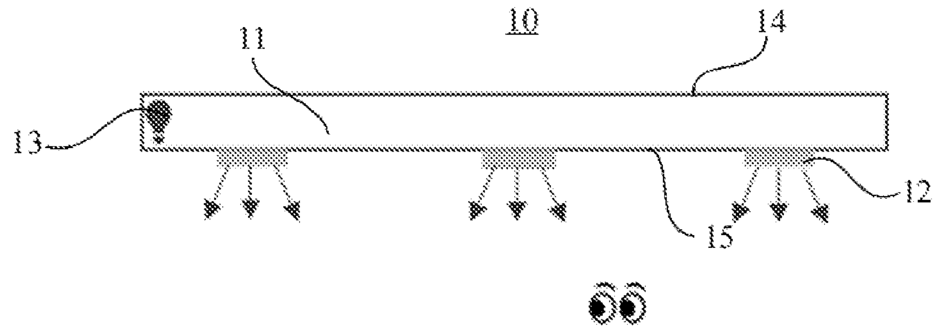
FIG. 1A is a schematic view of a first illumination mode of a glass assembly, in which a light guiding layer leads out the incident light emitted by a first light source integrated inside a glass body in scattering manner.

The implementation and use of the embodiments are discussed in detail below. However, it should be understood that the specific embodiments discussed merely exemplify the specific ways of implementing and using the present disclosure, and do not limit the scope of the disclosure. When describing the structural positions of various components, such as the directions of upper, lower, top, bottom, etc., the description is not absolute, but relative. When the various components are arranged as shown in the figures, these directional expressions are appropriate, but when the positions of the various components in the figures would be changed, these directional expressions would also be changed accordingly.

In this context, the expression "including" or similar expressions "including", "containing" and "having" which are synonymous are open, and do not exclude additional unlisted elements, steps or ingredients. The expression "consisting of . . . " excludes any element, step or ingredient that is not specified. The expression "consisting essentially of . . . " means that the scope is limited to the specified elements, steps or ingredients, plus the optional elements, steps or ingredients that do not materially affect the basic and new features of the claimed subject matter. It should be understood that the expression "comprising" covers the expressions "consisting essentially of" and "consisting of".

In this context, the terms "first", "second" and so on are not used to limit the sequence and the number of components unless otherwise stated.

In this context, the meanings of "a plurality of" and "multiple layers" refer to two or more than two, unless otherwise specified.

In this context, unless otherwise specified, the terms such as "installation", "connection" and "attach" should be understood broadly. For example, it can be fixed connection, detachable connection or integrated; it can be directly connected or indirectly connected through an intermediate medium, and it can be the internal communication of two elements or the interaction between two elements. For those skilled in the art, the specific meanings of the above terms in this context can be understood according to specific situations.

In this context, "glass" is an amorphous inorganic non-metallic material, which is generally made of a variety of inorganic minerals (such as quartz sand, borax, boric acid, barite, barium carbonate, limestone, feldspar, soda ash, etc.) as main raw materials, and a small amount of auxiliary raw materials. Its main components are silica and other oxides. In the described embodiments, the thickness of the glass is the thickness commonly used in the art, and the thickness of each laminated structure on the glass is suitable for the conventional range, and is not limited as shown in the figures and described in the following detailed description. In addition, although it is shown as plane glass in the figures, the glass of the present disclosure may also be curved glass. In various embodiments, it is described as an independent glass body or glass plate. However, in some cases, the surface of the glass body can also use a special coating to improve thermal insulation and/or comfort, and the glass body can also be laminated glass to obtain diversified functions or effects.

Hereinafter, the glass assembly applied to the vehicle window glass will be described, but it is not excluded that the glass assembly can be applied to door, window, curtain wall, airplane glass or ship glass. When the glass assembly is used to describe the window glass of a vehicle, "outside" and "inside" refer to the directions relative to vehicle body, "outside" refers to the direction away from the vehicle body and "inside" refers to the direction facing the vehicle body. It should be understood that the vehicle window glass according to the embodiment of the present disclosure includes, but is not limited to, front windshield, rear windshield, skylight glass, door glass or corner window glass, which can provide different illumination effects based on different requirements.

In the ever-changing automobile industry, a glass assembly with illumination and decorative effects has been widely used in medium-to-high-grade vehicles, such as vehicle skylights, which can not only achieve the effects of light intensity and/or color change, but also combine with coatings and/or sandwiched structures to form illumination effects with different patterns.

FIGS. 1A to 1D illustrate several glass assemblies with different illumination modes.

In a first illumination mode shown in FIG. 1A, a glass assembly 10 includes a glass body 11 having a first surface 14 and a second surface 15, a scattering layer 12 disposed on the second surface 15 of the glass body, and a light source 13. The light source 13 is, for example, a point or linear light source integrated inside the glass body 11, that is, a light source for illumination, such as an LED light-emitting strip. The scattering layer 12 can be light scattering particles arranged on the second surface 15 by mechanical structuring, embossing, etching or spraying, etc. At least a portion of the incident light emitted by the light source 13 into the glass body 11 is totally reflected at the first surface 14 and the second surface 15 so as to be able to propagate within the glass body 11. When the light reaches the area on the second surface 15 covered by the scattering layer 12, it can escape from the glass body, thus forming irradiation light to the outside, as shown by the arrow in the figure, that is, the area covered by the scattering layer 12 on the second surface can allow the light to escape. Therefore, the second surface 15 includes a total reflection area that can totally reflect light, and a light guiding area that can make the light escape from the glass body. Similarly, in the context of this description, the second surface of the glass body includes a total reflection area and a light guiding area.

The scattering layer 12 can also be an enamel printing layer or an ink printing layer based on pattern design, and can be arranged discontinuously on the second surface to produce different display patterns or display effects. When applied to a vehicle skylight, the first surface 14 faces the outside of the vehicle and the second surface 15 faces the inside of the vehicle, so that passengers in the vehicle can experience diversified illumination effects from the vehicle skylight.

Figure 1B:
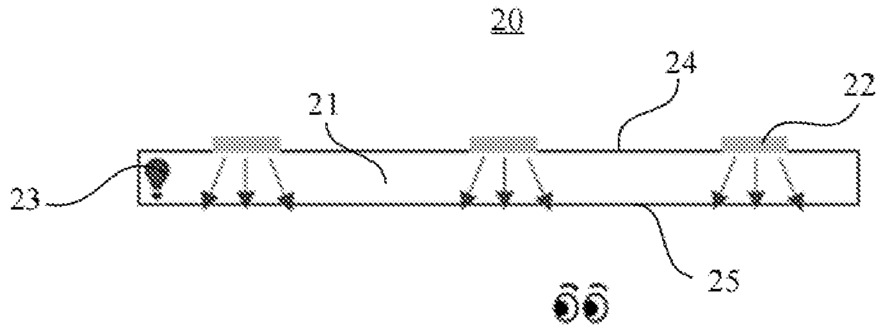
FIG. 1B is a schematic view of a second illumination mode of the glass assembly, in which a light guiding layer leads out the incident light emitted by a first light source integrated inside a glass body in diffusion manner.

In a second illumination mode shown in FIG. 1B, a glass assembly 20 includes a glass body 21 having a first surface 24 and a second surface 25, a diffusion layer 22 disposed on the first surface 24 of the glass body, and a light source 23. Similarly, the light source 23 is a point or linear light source integrated inside the glass body 21, and at least a portion of the incident light is totally reflected within the glass body and transmits out from the second surface 25 through the diffusion layer 22. The projection of the diffusion layer 22 on the second surface 25 forms the light guiding area, and the projection can be either an orthogonal projection or a projection offset by a certain angle, depending on the angle of the light.

Those skilled in the art can understand that both the scattering layer and the diffusion layer can make the light escape from the glass body by changing the refractive index of the interface.

Figure 1C:
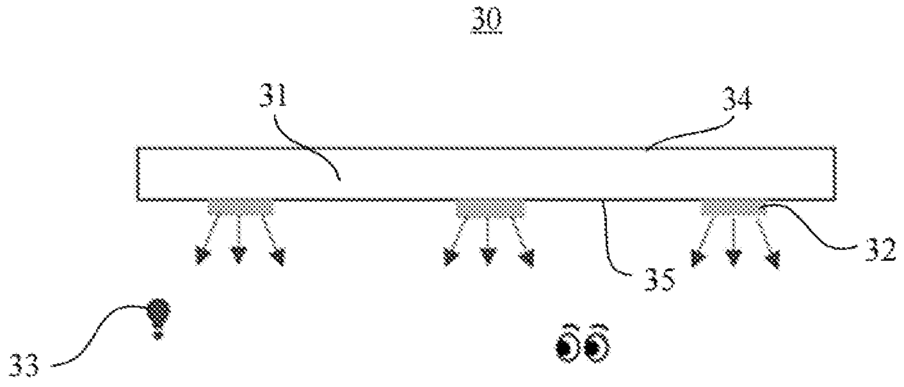
FIG. 1C is a schematic view of a third illumination mode of the glass assembly, in which a light guiding layer leads out the incident light emitted by a first light source arranged outside a glass body in scattering manner.

A third illumination mode shown in FIG. 1C is similar to that shown in FIG. 1A. A glass assembly 30 includes a glass body 31 having a first surface 34 and a second surface 35, a scattering layer 32 disposed on the second surface 35 of the glass body, and a light source 33. The difference is that the light source 33 is an external illumination light source arranged outside the glass body 31. It should be understood that the external illumination light source here may be a light source attached to the side of the glass body in a manner such as proximity, attachment, etc., for example, the light source attached to the side edge of the glass body emits the incident light, or the light source emits the incident light to the first surface or the second surface in a manner adjacent to the side edge.

Figure 1D:
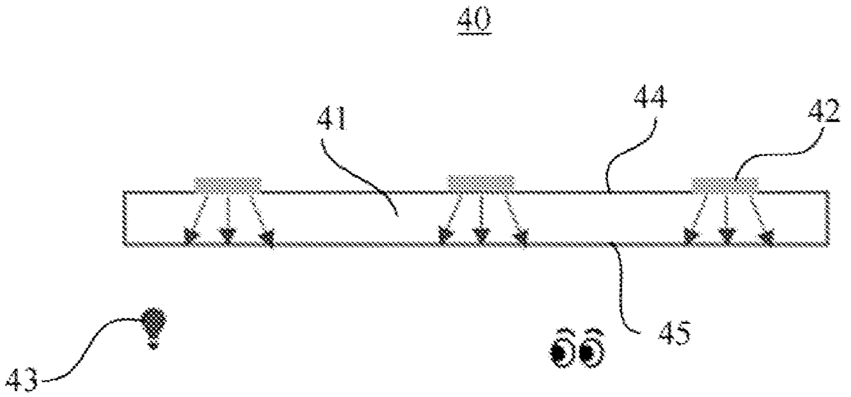
FIG. 1D is a schematic view of a fourth illumination mode of the glass assembly, in which a light guiding layer leads out the incident light emitted by a first light source arranged outside a glass body in diffusion manner.

A fourth illumination mode shown in FIG. 1D is similar to that shown in FIG. 1B. A glass assembly 40 includes a glass body 41 having a first surface 44 and a second surface 45, a diffusion layer 42 disposed on the first surface 44 of the glass body, and a light source 43, wherein the light source 43 is an external illumination light source similar to that shown in FIG. 1C.

Figure 2:
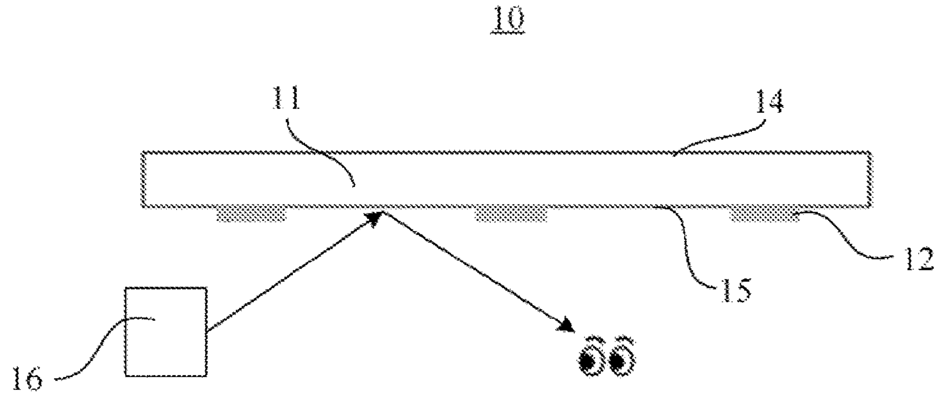
FIG. 2 is a schematic view of light pollution caused by a second light source when the existing glass assembly guides the light in scattering manner.

Among the above-mentioned various illumination modes, the illumination light source integrated inside the glass body and the illumination light source arranged outside the glass body are all represented by a first light source. When the illumination function of the above glass assembly is used normally, passengers in the vehicle may not feel uncomfortable. However, when the first light source used to stimulate the illumination effect is turned off, in a dark environment, since the glass has a considerable reflectivity, for example, about 4.2% at an air-glass interface, about 8.3% for the whole glass. At this time, as shown in FIG. 2, the glass assembly 10 of the first illumination mode is taken as an example. The light emitted by a second light source 16 in the vehicle such as the instrument panel or the central control screen will be incident on the second surface 15 from the outside of the glass body 11 to project a prominent image, and the image will be reflected to the inside of the vehicle, such as the light propagation path shown by the arrow, which will lead to light pollution causing discomfort to passengers' eyes, and may even lead to safety accidents.

According to the present disclosure, an anti-reflection layer is integrated on the glass assembly, so that the glass assembly has the illumination effect while reducing the light pollution, wherein the anti-reflection layer is attached to the surface through which the incident light emitted by the first light source is transmitted, so as to reduce the reflection of the light incident on the surface. The anti-reflective (AR) layer is a widely used optical coating, also known as anti-reflection film. Alternatively, the anti-reflection layer can be attached to the surface of the glass body by wet coating, physical vapor deposition or chemical vapor deposition.

FIGS. 3A to 7 respectively show glass assemblies of different embodiments of the present disclosure. In the following description, unless otherwise specified, the anti-reflection layer may be a single-layer film or formed by laminating multiple layers of films.

Figure 3A:
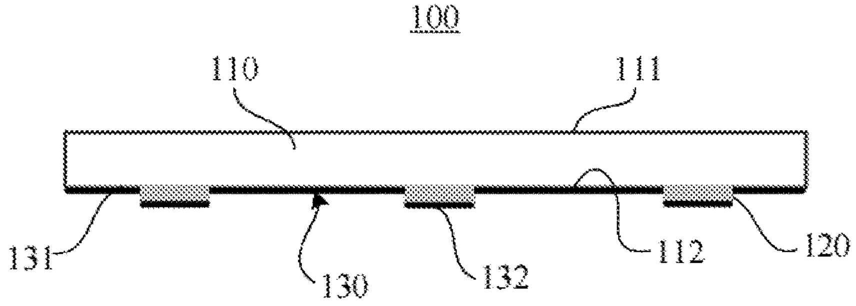
FIG. 3A is a schematic view of a glass assembly according to a first embodiment of the present disclosure.

First, referring to a first embodiment of FIG. 3A, a glass assembly 100 includes a glass body 110 having a first surface 111 and a second surface 112, and a light guiding layer 120 is disposed on the second surface 112. In this embodiment, the light guiding layer 120 is a scattering layer for guiding the incident light emitted by a first light source out from the second surface 112. The area of the second surface covered by the light guiding layer 120 forms the light guiding area. It should be understood that commercially available plating, coating or film with equivalent function or effect can be used as the above-mentioned light guiding layer. In addition, the number of layers and distribution of the light guiding layer can be determined as required, and are not limited to those shown in the figure. Alternatively, the light guiding layer is an enamel printing layer or an ink printing layer provided on the second surface 112 and having a pattern. The glass assembly 100 also includes an anti-reflection layer 130 attached to the second surface 112. In this embodiment, the anti-reflection layer 130 covers the total reflection area of the second surface and the light guiding layer 120. Specifically, the anti-reflection layer 130 includes a first part 131 covering the total reflection area of the second surface 112 and a second part 132 covering the surface of the light guiding layer 120. In this way, the light guiding layer 120 is pre-arranged on the second surface 112 to form a predetermined pattern, and the anti-reflection layer 130 can be coated on the second surface 112 having the light guiding layer 120 by a coating process, for example.

Figure 3B:
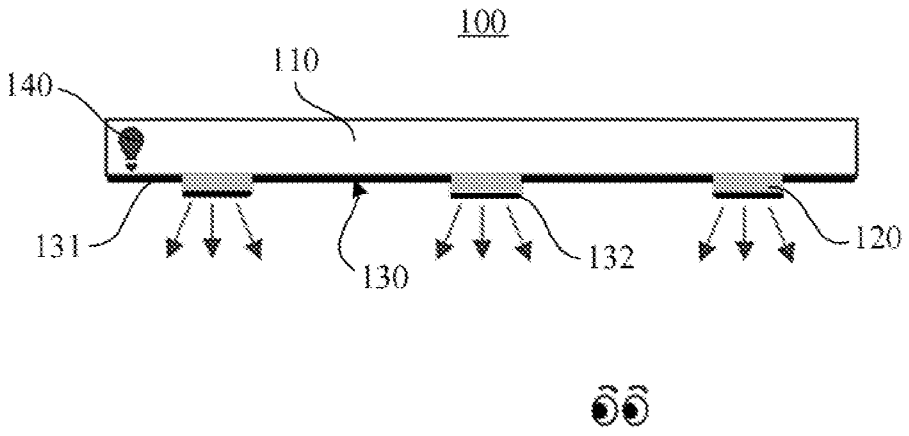
FIG. 3B is a schematic view of the illumination effect of the glass assembly according to the first embodiment of the present disclosure and a first light source integrated inside the glass body.
Figure 3C:
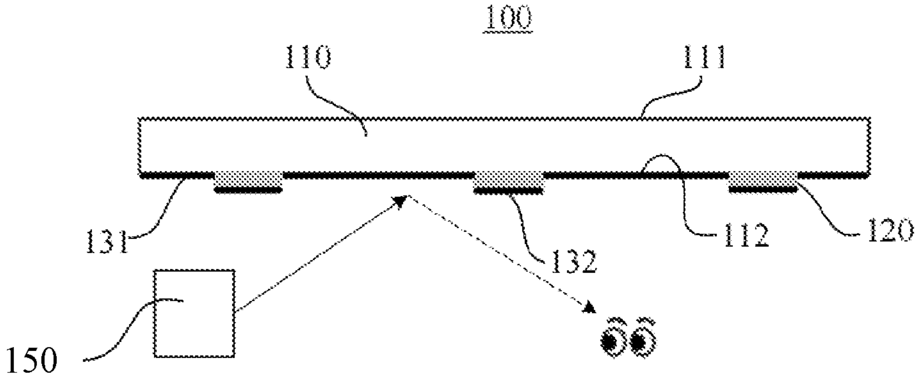
FIG. 3C is a schematic view of reducing light pollution by using the glass assembly according to the first embodiment of the present disclosure.

Compared with the existing design, when the glass assembly 100 is illuminated by a first light source 140 integrated inside the glass body 110, as shown in FIG. 3B, although the light guiding layer 120 is covered with the second part 132 of the anti-reflection layer 130, since the refractive index of the light guiding layer 120 made of ink or other materials is higher than that of the anti-reflection layer, the incident light is totally reflected in the glass body 110 and then led out through the light guiding layer 120, which will not significantly affect the existing illumination effect. When the first light source (not shown) outside the glass body is used for illumination, the power of the light source can be appropriately increased to avoid weakening the illumination effect. The glass assembly 100 of this embodiment is simple in processing technology and easy to implement. Furthermore, as shown in FIG. 3C, when the first light source for illumination is turned off, after the light emitted by a second light source 150 such as the instrument panel or central control screen inside the vehicle is irradiated on the second surface 112 of the glass body 110, as indicated by the dotted arrow, only a small amount of light or even no light is reflected from the second surface, thus effectively avoiding light pollution and enhancing the comfort of passengers. According to the test, using the glass assembly of the present disclosure, the light reflectivity can be reduced from about 8.3% to about 4.2% or even less than 3% by setting the anti-reflection layer on the second surface of the glass body (that is, the surface facing the interior of the vehicle). Under ideal experimental conditions, the light reflectivity is even zero. The measuring instruments are commercially available spectrometers, such as Perkin-Elmer Lambda 950 spectrometer.

Based on the above concept, the present disclosure can also have the following variations.

Figure 4:
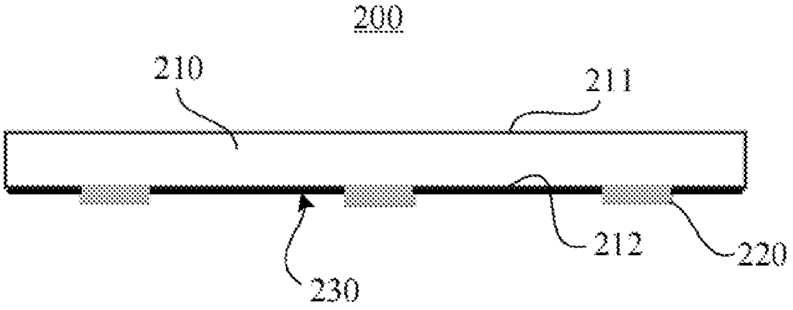
FIG. 4 is a schematic view of a glass assembly according to a second embodiment of the present disclosure.

FIG. 4 illustrates a glass assembly 200 according to a second embodiment of the present disclosure. The glass assembly 200 includes a glass body 210 having a first surface 211 and a second surface 212, and a light guiding layer 220 is disposed on the second surface 212. In this embodiment, the light guiding layer 220 is also a scattering layer, and the anti-reflection layer 230 is attached to the second surface 212 but does not cover the light guiding layer 220, that is, the anti-reflection layer 230 only includes a portion covering the total reflection area of the second surface 212. This can be done by directly coating the anti-reflection layer 230 on the second surface 212, and then attaching the light guiding layer 220 to the second surface 212 by etching and depositing a mask on the anti-reflection layer 230. With this design, both the first light source integrated inside the glass body and the first light source outside the glass body can obtain a good illumination effect, while for the second light source, the light guiding layer 220 made of ink, for example, and the anti-reflection layer 230 can effectively avoid the light pollution.

Figure 5:
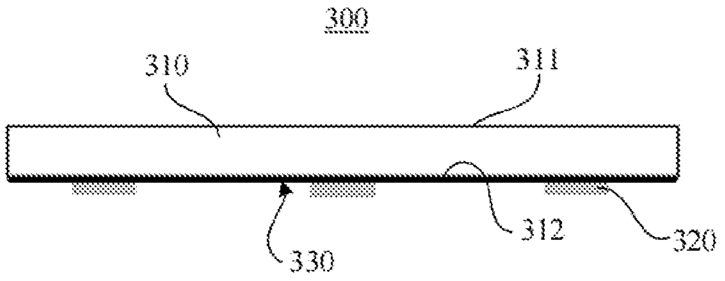
FIG. 5 is a schematic view of a glass assembly according to a third embodiment of the present disclosure.

FIG. 5 illustrates a glass assembly 300 according to a third embodiment of the present disclosure. The glass assembly 300 includes a glass body 310 having a first surface 311 and a second surface 312, and a light guiding layer 320 is disposed on the second surface 312. In this embodiment, the light guiding layer 320 is also a scattering layer. Different from the second embodiment, the anti-reflection layer 330 completely covers the second surface 312, and the light guiding layer 320 is laminated on the anti-reflection layer 330. In most cases, the refractive index of the anti-reflection layer is lower than that of the glass, and thus the anti-reflection layer 330 may cause the incident light emitted by the first light source integrated inside the glass body to be totally reflected within the glass body 310 and cannot be led out from the light guiding layer 320. This design is suitable for the case of the first light source outside the glass body.

Figure 6:
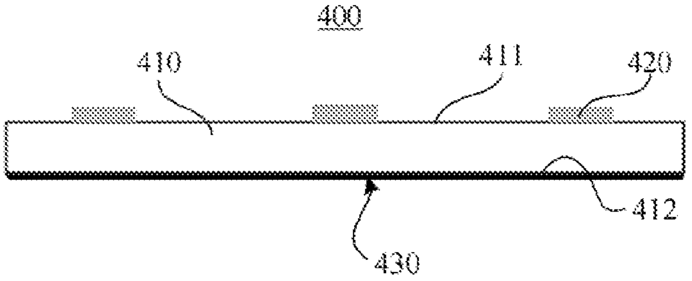
FIG. 6 is a schematic view of a glass assembly according to a fourth embodiment of the present disclosure.

FIG. 6 illustrates a glass assembly 400 according to a fourth embodiment of the present disclosure. The glass assembly 400 includes a glass body 410 having a first surface 411 and a second surface 412. In this embodiment, a light guiding layer 420 is a diffusion layer disposed on the first surface 411, and an anti-reflection layer 430 covers the second surface 412. This design is suitable for the case where the first light source for illumination is integrated inside the glass body or arranged outside the glass body.

Figure 7:
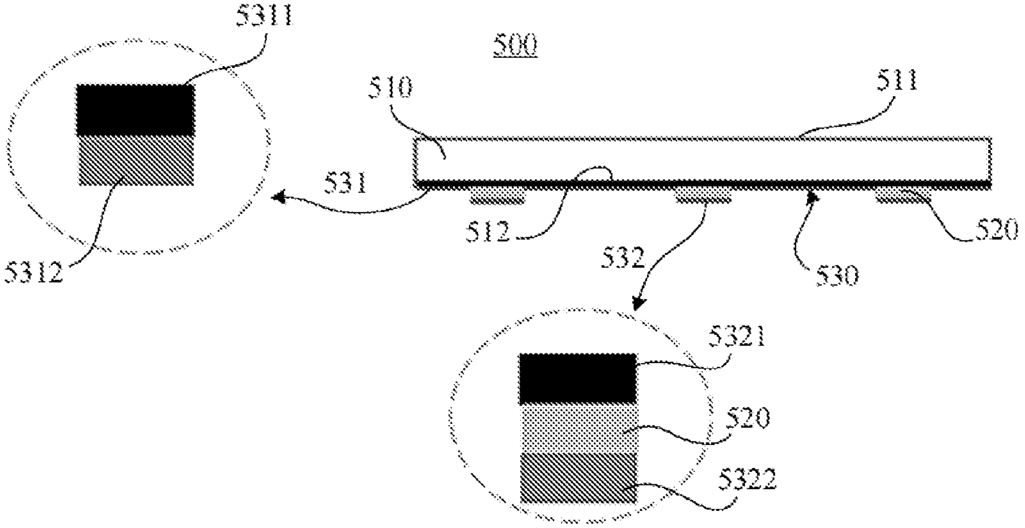
FIG. 7 is a schematic view of a glass assembly according to a fifth embodiment of the present disclosure.

FIG. 7 illustrates a glass assembly 500 according to a fifth embodiment of the present disclosure, which includes a glass body 510 having a first surface 511 and a second surface 512. In this embodiment, a light guiding layer 520 is a scattering layer disposed on the second surface 512, and an anti-reflection layer 530 covers the second surface 512. In the above embodiments, the anti-reflection layer, as a whole single film layer, may be a single-layer film or be formed by laminating multiple layers of films. In this embodiment, the anti-reflection layer 530 not only includes a first part 531 covering the total reflection area of the second surface 512 and a second part 532 covering the light guiding layer 520, but also is constructed in the form of laminated multiple layers of films. More specifically, the anti-reflection layer 530 includes a first anti-reflection film and a second anti-reflection film which are laminated, and the light guiding layer 520 is sandwiched between the first anti-reflection film and the second anti-reflection film. Referring to the partially enlarged view in FIG. 7, the first part 531 of the anti-reflection layer 530 includes a first anti-reflection film 5311 and a second anti-reflection film 5312 which are laminated, and the second part 532 of the anti-reflection layer 530 includes a first anti-reflection film 5321 and a second anti-reflection film 5322 which are laminated, and the light guiding layer 520 is sandwiched between the first anti-reflection film 5321 and the second anti-reflection film 5322 of the second part 532. Depending on different processes, the first anti-reflection film 5311 of the first part 531 and the first anti-reflection film 5321 of the second part 532 may be formed as a whole, or may be separately coated. Similarly, the second anti-reflection film 5312 of the first part 531 and the second anti-reflection film 5322 of the second part 532 can be applied by integrally coated or separately coated.

For the embodiment shown in FIG. 7, in order to make the incident light emitted by the first light source smoothly transmit in the glass body 510 and lead out from the light guiding layer 520, the refractive indexes of the first anti-reflection film 5311 of the first part 531 and the first anti-reflection film 5321 of the second part 532 close to the second surface 512 are advantageously greater than those of the glass body 510 and the second anti-reflection film 5312 of the first part 531 and the second anti-reflection film 5322 of the second part 532. It should be understood that in some embodiments, the first anti-reflection film and/or the second anti-reflection film is a single-layer film or can be laminated by multiple layers of films, as long as the refractive index of each layer gradually decreases in the direction away from the second surface.

From the above description, it can be seen that the glass assembly of the present disclosure integrates the anti-reflection layer in different ways, which can effectively reduce the unexpected light pollution while ensuring the illumination effect, and has the beneficial effects of simple process, obvious performance improvement and the like. The anti-reflection layer can be obtained from commercial products, and its thickness and material are not limited. In the described or non-described possible embodiments, the glass body can be selected as monolithic glass or laminated glass. For example, when it is applied to the front windshield or the skylight glass in the vehicle window glass, the laminated glass can be selected, which includes at least two layers of glass bodies and an intermediate layer (for example, PVB (Polyvinyl Butyral), or EVA (ethylene vinyl acetate)) that bonds them together. The anti-reflection layer can be attached to the inner surface of the laminated glass facing the interior of the vehicle, which can provide self-cleaning, hydrophobic and oleophobic functions in addition to reducing reflection. It should be understood that the laminated glass has been widely used in the field of vehicles, and a variety of functional layers are usually provided in the laminated glass to obtain different functions, such as dimming layer (such as PDLC, polymer dispersed liquid crystal; or EC, electrochromism), light-emitting layer, imaging layer, touch layer, etc. The application of the anti-reflection layer on the laminated glass in the present disclosure does not affect the function of these functional layers.

For the front and rear door glass or the rear windshield in the vehicle window glass, a single piece of tempered glass can be used. In this case, the anti-reflection layer is also attached to the inner surface of the single piece of glass facing the interior of the vehicle. Alternatively, the glass body is ultra-transparent float glass or non-ultra-transparent float glass. When the non-ultra-transparent float glass is selected, it is suitable for illumination by the first light source outside the glass body through the scattering layer. Alternatively, the glass body is ultra-transparent float glass with a transparent conductive oxide (TCO) coating. In this way, the refractive index of the transparent conductive oxide is usually greater than that of the anti-reflection layer, and the anti-reflection layer is advantageously attached to the transparent conductive oxide coating, that is, the anti-reflection layer is arranged on the surface of the glass assembly closest to the interior of the vehicle to achieve the best anti-reflection effect.

It should be understood here that the embodiments shown in the drawings only illustrate the optional architectures, shapes, sizes and arrangements of various optional components of the glass assembly according to the present disclosure; however, it is only illustrative rather than restrictive, and other shapes, sizes and arrangements can be adopted without departing from the spirit and scope of the present disclosure.

The technical content and technical features of the present disclosure have been disclosed above. However, it can be understood that those skilled in the art can make various changes and improvements to the above disclosed concept under the creative idea of the present disclosure, all of which fall within the protection scope of the present disclosure. The description of the above embodiments is illustrative rather than restrictive, and the protection scope of the present disclosure is determined by the claims.

The invention claimed is:

1. A glass assembly, wherein the glass assembly comprises:

a glass body having a first surface and a second surface which are oppositely arranged, wherein at least a portion of incident light entering the glass body is totally reflected between the first surface and the second surface;

a light guiding layer arranged on the second surface for guiding the incident light out of the second surface, and an anti-reflection layer attached to the second surface to reduce reflection of the light incident on the second surface from outside of the glass body.

2. The glass assembly according to claim 1, wherein the second surface comprises a total reflection area and a light guiding area, and the anti-reflection layer covers the total reflection area on the second surface.

3. The glass assembly according to claim 2, wherein the light guiding layer is a scattering layer arranged on the second surface and forms the light guiding area on the second surface, and the anti-reflection layer is attached to the second surface and only covers the total reflection area on the second surface.

4. The glass assembly according to claim 2, wherein the light guiding layer is a scattering layer arranged on the second surface and forms the light guiding area on the second surface, and the anti-reflection layer is attached to and covers the second surface, and wherein the light guiding layer is laminated on the anti-reflection layer.

5. The glass assembly according to claim 1, wherein the anti-reflection layer is a single-layer film or formed by laminating multiple layers of films.

6. The glass assembly according to claim 1, wherein the light guiding layer is an enamel printing layer or an ink printing layer provided on the second surface and having a pattern.

7. The glass assembly according to claim 1, wherein the light guiding layer is discontinuously arranged on the second surface.

8. The glass assembly according to claim 1, wherein the glass assembly comprises a first light source which emits the incident light totally reflected between the first surface and the second surface to realize illumination, and the light incident on the second surface from the outside of the glass body is emitted by a second light source.

9. The glass assembly according to claim 1, wherein the anti-reflection layer is attached to the second surface by wet coating, physical vapor deposition or chemical vapor deposition.

10. The glass assembly according to claim 1, wherein the glass body is monolithic glass or laminated glass.

11. The glass assembly according to claim 10, wherein the glass body is ultra-transparent float glass or non-ultra-transparent float glass.

12. The glass assembly according to claim 11, wherein the glass body is an ultra-transparent float glass with a transparent conductive oxide coating, and the anti-reflection layer is attached to the transparent conductive oxide coating.

13. A vehicle window glass, wherein the vehicle window glass is made of a glass assembly according to claim 1, and wherein the first surface of the glass body faces an outside of the vehicle and the second surface of the glass body faces an inside of the vehicle.

14. The vehicle window glass according to claim 13, wherein the vehicle window glass is front windshield, rear windshield, skylight glass, door glass or corner window glass.

15. A vehicle, wherein the vehicle comprises a vehicle window glass according to claim 13.

16. A glass assembly, wherein the glass assembly comprises:

a glass body having a first surface and a second surface which are oppositely arranged, wherein at least a portion of incident light entering the glass body is totally reflected between the first surface and the second surface;

a light guiding layer arranged on the first surface or the second surface for guiding the incident light out of the second surface, and an anti-reflection layer attached to the second surface to reduce reflection of the light incident on the second surface from outside of the glass body, wherein the second surface comprises a total reflection area and a light guiding area, and the anti-reflection layer covers the total reflection area on the second surface, and wherein the light guiding layer is a scattering layer arranged on the second surface and forms the light guiding area on the second surface, and the anti-reflection layer is attached to the second surface and covers the light guiding area and the total reflection area.

17. A glass assembly, wherein the glass assembly comprises:

a glass body having a first surface and a second surface which are oppositely arranged, wherein at least a portion of incident light entering the glass body is totally reflected between the first surface and the second surface;

a light guiding layer arranged on the first surface or the second surface for guiding the incident light out of the second surface, and an anti-reflection layer attached to the second surface to reduce reflection of the light incident on the second surface from outside of the glass body, wherein the anti-reflection layer is attached to and covers the second surface, and wherein the anti-reflection layer comprises a first anti-reflection film and a second anti-reflection film which are laminated, and the light guiding layer is sandwiched between the first anti-reflection film and the second anti-reflection film.

18. The glass assembly according to claim 17, wherein the first anti-reflection film is close to the second surface, and a refractive index of the first anti-reflection film is greater than a refractive index of the glass body and a refractive index of the second anti-reflection film.

19. The glass assembly according to claim 17, wherein the first anti-reflection film and/or the second anti-reflection film is a single-layer film or formed by laminating multiple layers of films.

* * * * *